(12) United States Patent
Wang et al.

(10) Patent No.: US 7,307,998 B1
(45) Date of Patent: Dec. 11, 2007

(54) COMPUTER SYSTEM AND NETWORK INTERFACE SUPPORTING DYNAMICALLY OPTIMIZED RECEIVE BUFFER QUEUES

(75) Inventors: Chi-Lie Wang, Fremont, CA (US); BaoDong Hu, Milpitas, CA (US); Scott W. Mitchell, San Jose, CA (US)

(73) Assignee: 3Com Corporation, Marlborough, MA (US)

( * ) Notice: Subject to any disclaimer, the term of this patent is extended or adjusted under 35 U.S.C. 154(b) by 1051 days.

(21) Appl. No.: 10/229,361

(22) Filed: Aug. 27, 2002

(51) Int. Cl.
*H04L 12/54* (2006.01)

(52) U.S. Cl. .................. 370/412; 370/419; 370/429; 710/52; 711/118

(58) Field of Classification Search ............ 370/233, 370/234, 412, 413, 414, 415, 416, 417, 418, 370/419; 710/52, 56, 57; 711/117, 118, 711/126
See application file for complete search history.

(56) References Cited

U.S. PATENT DOCUMENTS

| | | | |
|---|---|---|---|
| 4,500,990 | A | 2/1985 | Akashi |
| 5,473,607 | A | 12/1995 | Hausman et al. |
| 5,530,703 | A | 6/1996 | Liu et al. |
| 5,615,340 | A | 3/1997 | Dai et al. |
| 5,909,686 | A | 6/1999 | Muller et al. |
| 6,108,713 | A | 8/2000 | Sambamurthy et al. |
| 6,154,446 | A | 11/2000 | Kadambi et al. |
| 6,356,951 | B1 | 3/2002 | Gentry, Jr. |
| 2002/0064171 | A1* | 5/2002 | Belk ................. 370/412 |
| 2002/0087758 | A1* | 7/2002 | Dixon ................. 710/56 |
| 2003/0112758 | A1* | 6/2003 | Pang et al. ............ 370/235 |
| 2003/0140196 | A1* | 7/2003 | Wolrich et al. .......... 711/118 |

FOREIGN PATENT DOCUMENTS

| | | |
|---|---|---|
| WO | WO 00/52869 | 9/2000 |
| WO | WO 00/52904 | 9/2000 |
| WO | WO 01/37489 | 5/2001 |

OTHER PUBLICATIONS

"Network Device Class" Microsoft Corporation, published at http://www.microsoft.com/hwdev/specs/PMref/PMnetwork.htm. pp. 1-11, dated Sep. 23, 1999.

* cited by examiner

*Primary Examiner*—Chi Pham
*Assistant Examiner*—Shick Hom
(74) *Attorney, Agent, or Firm*—McDonnell Boehnen Hulbert & Berghoff LLP (57) ABSTRACT

A network interface comprises the first port on which incoming data is transmitted and received at the data transfer rate of the network, a buffer memory coupled to the first port, and a second port coupled with the buffer memory, and through which transfer of packets between the host system, and the buffer memory is executed. A driver in the host system allocates a plurality of sets of receive buffers, where each set of receive buffers is composed of receive buffers having different sizes. A receive buffer descriptor cache located at the interface level stores receive buffer descriptors corresponding to receive buffers in the plurality of sets. As incoming packets arrive at the interface, logic determines the size of the incoming packet and assigns the packet to a receive buffer descriptor in the receive buffer descriptor cache according to the determined size. Upload logic at the interface level manages the uploading of packets from the buffer memory to the host system using the assigned receive buffer descriptors. A driver in the host dynamically adjusts the sizes of receive buffers in response to statistics about packet size.

45 Claims, 7 Drawing Sheets

COMPUTER SYSTEM AND NETWORK INTERFACE SUPPORTING DYNAMICALLY OPTIMIZED RECEIVE BUFFER QUEUES

BACKGROUND OF THE INVENTION

1. Field of the Invention

The present invention relates to network interface devices for interconnecting host processors with a communication network, and more particularly to providing for efficient utilization of host memory supported by high speed, and/or embedded hardware at the network interface.

2. Description of Related Art

Network interface cards (NIC) are often be used for network connection between a host system and a network medium. NICs have integrated circuits with buffer memory for storing packets in transit. For outgoing traffic, the packets being downloaded from host memory via the host bus system go through a transmit packet data buffer and medium access control MAC unit to be transmitted onto the wire, optical fiber, or antenna (or otherwise transmitted on a network medium). For incoming traffic, the packet being received from the network medium can go through the MAC unit and a receive packet data buffer to be uploaded into host memory.

Packets arrive at the network interface at rates that vary over time, and according to some protocols, without prior notification of the host system. Drivers running in the host system are designed to prepare for the packet flow, and to respond to messages from the interface relating to incoming packets. In order to prepare for receiving such packets from the network, the drivers in the host systems typically allocate memory in advance to act as buffers into which incoming packets can be stored. In some systems, lists of descriptors, called receive buffer descriptors herein, for the buffers are prepared by the drivers, to be used in the process of uploading packets into the allocated buffers.

In one approach, a receive buffer descriptor ring is used to store receive buffer descriptors (RBD). Each RBD consists of the address and length of the receive buffer in host memory. These buffers can be used to store the uploaded packets in host memory after they have been received in buffer memory on the interface. The buffers are usually defined to have a buffer size equal to the maximum packet size for standard packets according to the protocol in use. For example, for Ethernet networks the maximum standard packet size is 1.5 kilobytes. Therefore, in the typical system, all receive buffers to the network consume 1.5 kilobytes. However, the minimum valid packet size is 64 bytes. A 64 byte packet may be allocated to a receive buffer that is 1.5 kilobytes, wasting most of the host memory space for the buffer. Allocating buffers in advance simplifies and speeds up the process of uploading packets into the host system. However, to the extent that packets are received that have less than the maximum standard packet size, host memory resources are wasted.

In order to improve system throughput and reduce CPU utilization in networks characterized by transfers of large files, "jumbo" packets can be used which have a packet size greater than the maximum standard packet size for the protocol. For example, "jumbo" packets having a 9 kilobyte size and a 16 kilobyte size have been implemented. Jumbo packets can be mixed with normal packets on the network, and their order can be completely random. Therefore, receive buffers in such systems have been defined to handle the maximum size of the jumbo packet. This exacerbates the inefficiency of prior art systems for allocating receive buffers in advance, causing inefficient use of host memory.

With 100 Megabit, Gigabit and higher wire speeds, combined with jumbo packet sizes, it becomes even more difficult to manage memory allocation.

It is desirable to provide a network interface capable of receiving packets having widely varying sizes, with efficient management of host memory resources in high speed network systems.

SUMMARY OF THE INVENTION

The present invention provides an interface that comprises a first port on which incoming data is transmitted and received at the data transfer rate of the network, a buffer memory coupled to the first port, and a second port coupled with the buffer memory, and through which transfer of packets between the host, including a host bus system, and the buffer memory is executed. A driver in the host system allocates a plurality of sets of receive buffers, where each set of receive buffers is composed of receive buffers having different sizes. A receive buffer descriptor cache located at the interface level stores receive buffer descriptors corresponding to receive buffers in the plurality of sets. As incoming packets arrive at the interface, logic determines the size of the incoming packet and assigns the packet to a receive buffer descriptor in the receive buffer descriptor cache according to the determined size. Upload logic at the interface level manages the uploading of packets from the buffer memory to the host system using the assigned receive buffer descriptors.

In embodiments in which the interface operates according to a network protocol having a maximum standard packet size and a maximum jumbo packet size, the plurality of sets of receive buffers include a first set of receive buffers having buffer sizes specified according to a maximum standard packet size parameter (e.g. 1.5 kilobytes for ethernet), a second set of receive buffers having buffer sizes specified according to an intermediate standard packet size parameter (e.g. an average packet size over a number of packets or bytes received at the interface), a third set of receive buffers having buffer sizes specified according to a maximum jumbo packet size parameter, larger then the maximum standard packet size parameter (e.g. 9 to 16 kilobytes in representative systems), and a fourth set of receive buffers having buffer sizes specified according to an intermediate jumbo packet size parameter (e.g. an average jumbo packet size over a number of jumbo packets or bytes in jumbo packets received at the interface).

At the interface level, incoming packets are classified according to packet size. For example, a byte counter is used in one approach to determine whether an incoming packet has a packet size less than or equal to the maximum standard packet size. If the incoming packet size is less than or equal to the maximum standard packet size, then logic determines whether the incoming packet size is less than or equal to the intermediate standard packet size. If the packet size is less than or equal to the intermediate standard packet size, but greater than a minimum valid packet size, the packet is assigned to a receive buffer descriptor corresponding to a receive buffer in the second set of receive buffers. Packets having a packet size greater than the intermediate standard packet size are assigned to a receive buffer descriptor corresponding to a receive buffer in the first set of receive buffers. If the incoming packet size is greater than the maximum standard packet size, then the logic determines whether the packet size is greater than the intermediate jumbo packet size, less than or equal to the maximum jumbo packet size, or greater than the maximum jumbo packet size. The packet is assigned then a receive buffer descriptor for either a mini-jumbo receive buffer or a jumbo receive buffer, or it is discarded, based on the determined packet size.

In addition, logic maintains statistics about the sizes of incoming packets, which are reported to the host system, and used by a driver executing on the host to optimize the allocation of receive buffers. In a preferred example, the logic determines the first average size of incoming packets having a packet size less than or equal to the maximum standard packet size, and determines a second average size of incoming packets having a packet size less than or equal to the maximum jumbo packet size and greater than the maximum standard packet size. The first and second averages are used by the host system to define the buffer sizes for the receive buffers allocated for the intermediate packet sizes.

Thus, embodiments of the invention include logic at the interface level that supports dynamic optimization of the buffer size parameters used for allocation of receive buffers in the host. In one embodiment, logic determines an average packet size over a set of packets received at the interface, and reports the average packet size to the host system by storing the value in a host accessible register, and issuing an interrupt or otherwise.

The invention is also embodied by a method for managing an interface including providing at the network interface level, a receive buffer descriptor cache as described above including a plurality of sets of receive buffer descriptors corresponding to sets of receive buffers in the host system, and assigning packets stored in a buffer memory at the network interface to a receive buffer descriptor in one of the plurality of sets according to packet size. In some embodiments, the sets of receive buffer descriptors include sets having a single member, so that there is one receive buffer descriptor stored in the receive buffer descriptor cache for a corresponding set of receive buffers allocated in the host system. According to the method of the present invention, the sizes of the receive buffers for at least one of the sets of receive buffers in the host memory are dynamically adjusted according to statistics about network traffic.

The invention is also embodied by a driver executing in the host system, which is coupled to a network interface as described above. The driver dynamically allocates receive buffers in response to statistics about the sizes of packets being received on interface. Thus, in one embodiment, the driver responds to interrupt signals from the network interface to read average packet size data from the network interface, and to adjust the sizes of receive buffers in response to the average packet size data.

According to one embodiment of the invention, an integrated circuit supporting a network interface is provided. The integrated circuit in this embodiment of the invention comprises a medium access control unit through which data is transferred at a data transfer rate of 100 Mbps or higher. The integrated circuit includes a port adapted to be coupled with the host system and a buffer memory coupled with the medium access control unit and the port. Memory supporting a receive buffer descriptor cache is provided on integrated circuit, along with logic to assign packets stored in the buffer memory to a receive buffer descriptor according to packet size, and logic to manage uploading of packets using the assigned receive buffer descriptors.

The invention also provides a computer system comprising a host CPU, a host bus system and a network interface coupled to a high-speed data network, in which packets are assigned to receive buffers according to packet size, and which is configured to operate with a data rate of 100 megabits/second or higher. Particularly, the invention enables operation of computer systems with sophisticated functional logic at the network interface level operating with for example gigabit and 10 gigabit per second data speeds.

Other aspects and advantages of the present invention will be seen on review of the figures, the detailed description and the claims, which follow.

DETAILED DESCRIPTION

Figure 1:
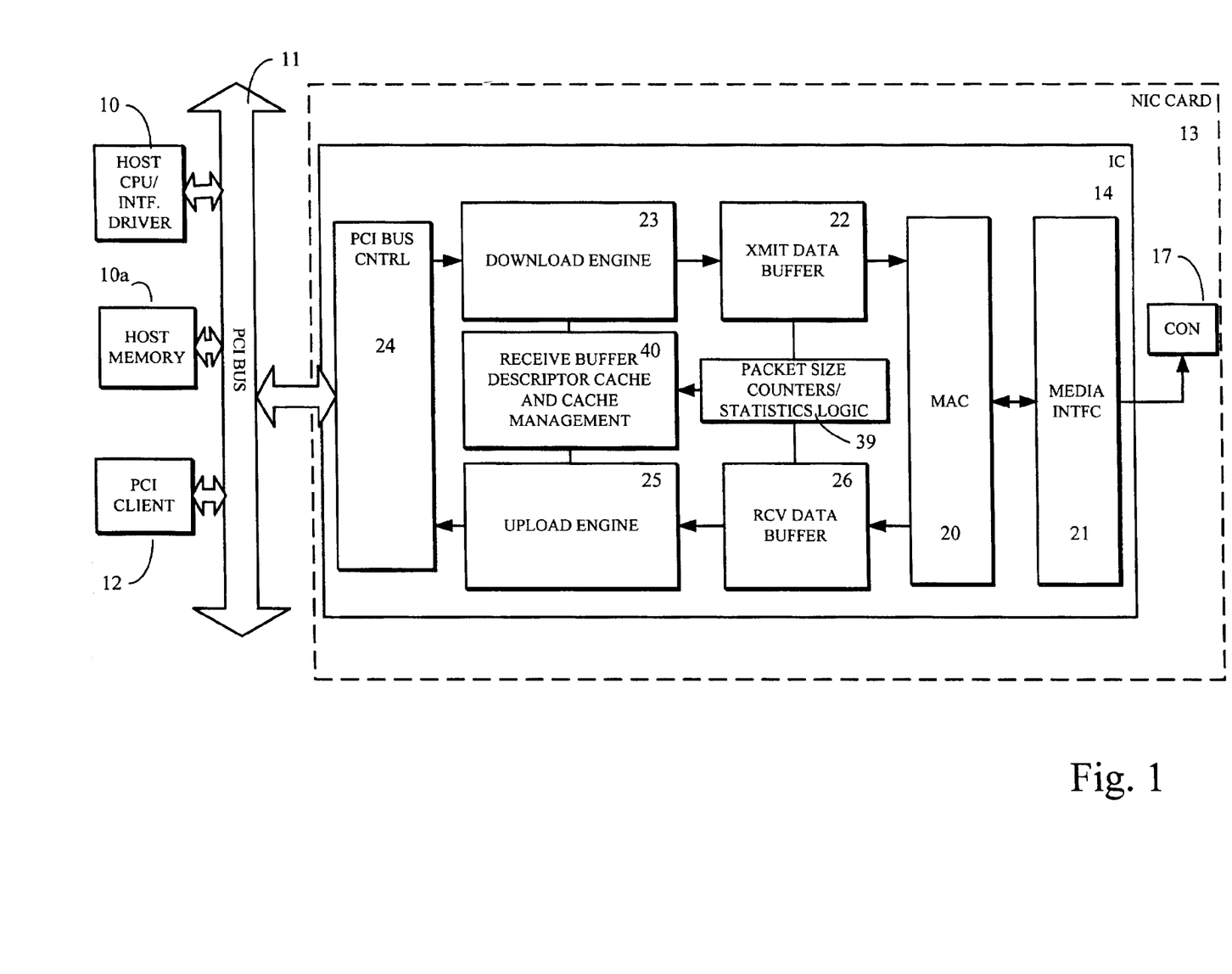
FIG. 1 is a simplified block diagram of a network interface including features of the present invention.

FIG. 1 provides a basic diagram of a data processing system having a host CPU 10 and host memory 10a, coupled to a bus system 11, such as a PCI bus. The bus 11 interconnects a plurality of PCI clients, including client 12 and the network interface card 13 shown with expanded functional blocks. Other bus architectures are used in other embodiments of computer systems. The network interface card 13 includes an application specific integrated circuit IC 14. The IC 14 includes network interface functions for an Ethernet interface (in 100 Megabit, Gigabit, or faster formats for example) in this embodiment. Other embodiments provide interfaces to other types of the network protocols, such as Infiniband. In addition to the IC 14, other components are interconnected by and supported by the circuit board of the network interface card 13. For example, a BIOS ROM (not shown), an EEPROM (not shown) and a medium connector 17 are on the circuit board. The network interface may also be implemented on a motherboard or other mounting arrangement. Also, the integrated circuit may be a system-on-a-chip device including the network interface logic, and other resources including a host processor.

The data processing system also includes a system management bus (not shown) coupled to the various components, including a host CPU 10, the PCI client 12, and the network interface chip 14.

The IC 14 includes a medium access controller (MAC) 20 coupled to media interface circuitry 21 connecting to the connector 17. The medium access controller 20 is also coupled to buffer memory on the IC 14, including a transmit FIFO buffer 22 which is driven by a download engine 23 on the IC 14. The download engine 23 is coupled to a PCI bus controller 24. The PCI bus controller 24 is also coupled to an upload engine 25. The upload engine 25 is coupled to a receive FIFO 26 which is connected to the medium access controller 20. Thus, the illustration of the IC 14 includes basic elements of a network interface controller chip.

The network interface is used to connect to the network and provide communication paths to pass messages to remote systems. The network interface operates in cooperation with a driver and operating system in the host system, normally through the host bus system 11. On the transmit side, the packets can be downloaded through host bus system 11 to the transmit packet buffer 22. The packets are forwarded to the medium access controller (MAC) 20, which converts the packets to conform with the IEEE 802.3 Data Link layer protocol. These packets will finally go through the physical layer interface 21 and be transmitted onto the wire (or other type of media, including wireless media) via an connector 17. On the receive side, the packets being received from the wire will go through the physical layer interface 21 and the MAC 20 before getting written into receive packet buffer 26. These packets will then be uploaded through the host bus system 11 to host memory. The host bus interface 24 on the NIC 13 in this example consists of PCI slave and PCI master. The function of the PCI slave is to determine whether to accept a transaction initiated from the PCI Host. This transaction will be used to initialize NICs' registers (including registers described below), check status, handle interrupts and control data movement. The function of the PCI master is to download the packets to be transmitted and upload the packets being received through the PCI Bus. Each packet to be transmitted typically consists of multiple fragments and each fragment can be located in different chunks (often referred to as buffers) of host memory. Data downloading starts with fetching the address and the length information of each fragment, usually from a packet descriptor composed by host software, followed by downloading the packet data from host memory to the transmit buffer 22. This process repeats until all the fragments within a packet are downloaded. In some systems, multiple transmit packet descriptors are created, and stored in a list, to facilitate transmission of multiple packets. In these systems, the downloading process continues according to algorithms used for controlling the descriptor lists.

Data uploading is handled like data downloading except the direction of the data is reversed, with data flowing through the receive FIFO buffer 26 to the host bus system 11. Control of uploading is also managed using descriptors of receive buffers in host memory 10*a*, or other memory accessible using the host bus system, that are allocated for receiving packets by host software. Descriptors for received packets can be stored on the NIC 13 in receive buffer descriptor cache and cache management block 40, and used as needed by the upload engine 25. Multiple receive packet descriptors are created, and stored in a list, to facilitate reception and uploading of multiple packets of varying size. According to the present invention, packet size counters and statistics logic block 39 is coupled to the data path for incoming packets. Packets are assigned to receive buffer descriptors by the cache management logic in block 40, according to the sizes of the packets. In these systems, the uploading process continues according to algorithms used for controlling the descriptor lists, as long as packets are available for uploading from the receive data buffer 26.

Figure 2:
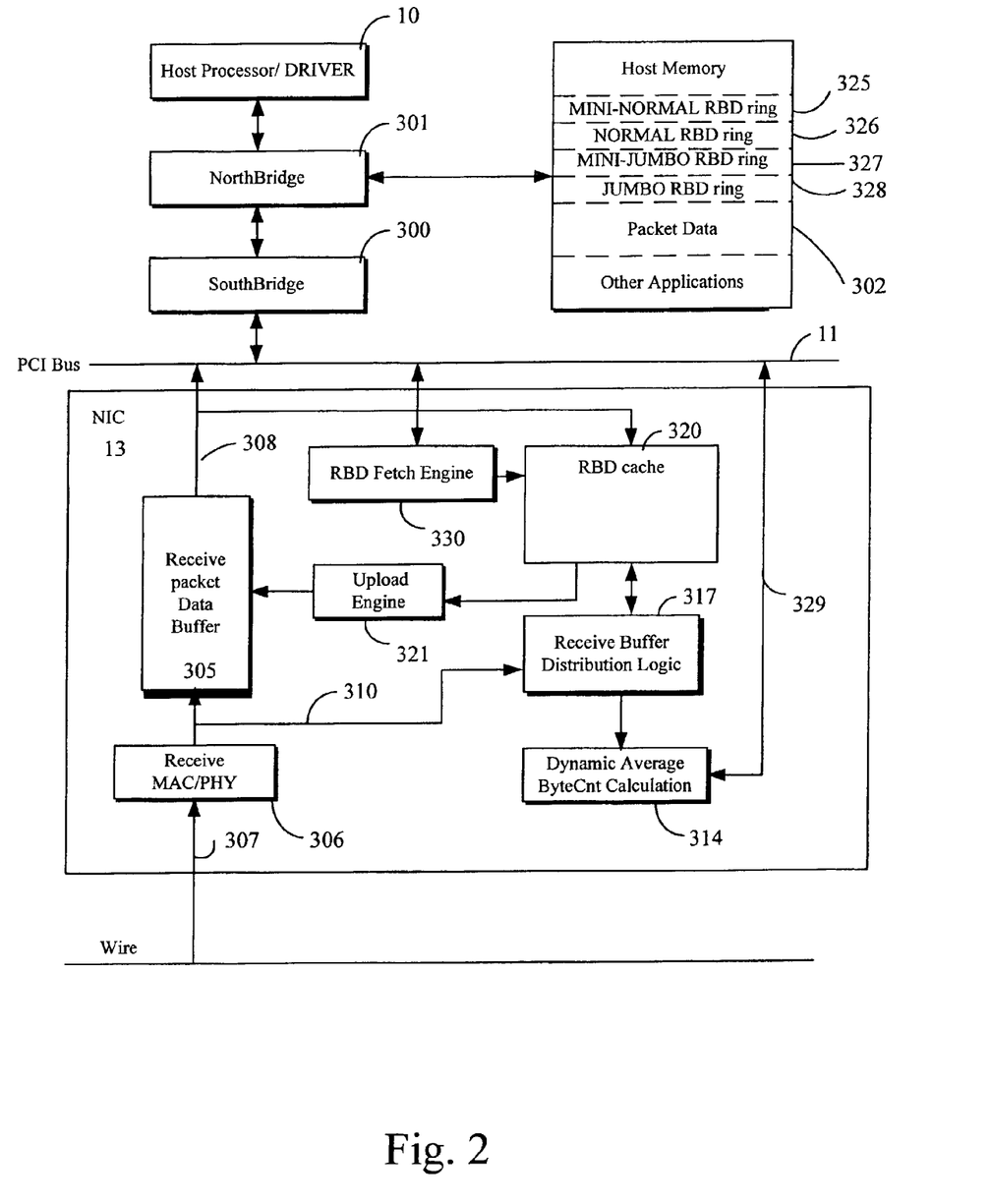
FIG. 2 is a simplified diagram of a computer system including dynamically allocated receive buffers according to the present invention.

FIG. 2 illustrates a basic block diagram of a data processing system including a NIC 13, host bus system 11, and host CPU 10 as illustrated in FIG. 1, for the purposes of describing the management of dynamic receive buffer allocation. In a host bus system running a PCI bus protocol, a typical configuration includes a so-called "southbridge" 300 coupled to the bus 11. A "northbridge" 301 is coupled to the southbridge, and to high-speed host memory 302. The host CPU 10 is coupled to the northbridge 301. Other configurations of host bus systems may be utilized as well, providing access by the host processor 10 to the host memory 302. The host memory 302 is used for a variety purposes, including storing packet data uploaded or ready to be downloaded to the NIC 13, receive buffer descriptor RBD lists, and memory for other applications. Such data may also be stored in other host memory accessible using the host bus system 11. In this example, the receive buffer descriptor RBD lists are implemented in a ring format, and include mini-normal RBD ring 325, normal RBD ring 326, mini-jumboRBD ring 327 and jumbo RBD ring. According to this embodiment each ring 325, 326, 327, 328 is utilized for a different size of received packets, an embodiment of which is described in more detail below. The host driver software sets up the RBD rings in host memory in response to statistics about packet size gathered in the network interface, or other information useful in predicting characteristics of network traffic. Packets that qualify for a given ring, based on packet size, are identified in the interface.

In FIG. 2, some of the functional components of the NIC 13 supporting dynamic receive buffer allocation are illustrated. Thus, a receive packet data buffer 305 is coupled by an incoming data path 310 to the MAC and physical interface 306, which is in turn coupled to the network medium 307. The buffer 305 is coupled via line 308 to the host bus system 11. The incoming data path 310 is coupled to receive buffer distribution logic 317, like that described below with respect to FIG. 3. Statistics about received packets being stored in the buffer 305 are gathered in dynamic average byte count calculation logic 314, which interrupts the host system via line 329, when a statistic is updated and/or ready to be utilized by the host driver. A receive buffer descriptor cache 320 stores at least a portion of each of the receive buffer descriptor rings in the host memory 302, which are active during the uploading of the packet. While packets are available for upload, the packet upload engine 321 accesses an entry from one of the rings in the receive buffer descriptor cache 320 and receives the receive buffer address for the host buffer in host memory, as well as the packet address and packet length for the corresponding packet in the receive packet data buffer 305. These parameters are utilized to control uploading of the corresponding packet into the host memory or other locations accessible via the host bus system.

An RBD fetch engine 330 is coupled to the host system and to the RBD cache 320, and manages the lists of RBDs in the cache. In one embodiment, there is a set of RBD lists in the cache 320 in the network interface level of the system, where members of the set of RBD lists correspond to respective RBD rings in host memory. Each RBD list in the cache 320 can be used to store a subset (one or more members) of the RBDs prefetched from the corresponding RBD ring in the host. RBD cache prefetch logic 330 not only improves PCI Bus bandwidth utilization but also allows the upload DMA engine to access the entry from RBD cache more efficiently.

The set of RBD rings, referred to herein as mini-normal 325, normal 326, mini-jumbo 327 and jumbo 328, can be implemented using an interface driver executed by the host CPU 10, to optimize receive buffer usage in memory 302, and other memory accessible using the host bus system. While normal and jumbo RBD rings allocate a number of receive buffers (sometimes 16 or 32 in each ring) in host memory to receive the maximum size of standard and jumbo packets as specified by the protocol, mini-normal and mini-jumbo RBD rings allocate receive buffers in host memory to receive intermediate sized packets, such as the average or median size of the normal packets and the average or median size of the jumbo packets. In addition, the receive buffer size in one or both of the two rings for intermediate sized packets is dynamically adjusted based on the packet sizes actually being received, and for different system applications.

When a packet is being received in Receive Packet Data Buffer, its size is determined and it is assigned to a corresponding entry in the cache according to the determined size. A packet is assigned to an entry in the RBD cache by, for example, having its address stored into the corresponding RBD cache entry along with the packet length. The updated RBD entry will allow the received packet to be fetched from the right location within Receive Packet Data Buffer and to be uploaded into host memory.

Features of the dynamically optimized receive buffer system of the present invention include but are not limited to the following:

Multiple RBD rings such as mini-normal, normal, mini-jumbo and jumbo can be used to allocate different receive buffer sizes to optimize host memory usage for packet upload operation.

Each RBD ring has its local RBD set in the RBD cache, which can be prefetched in burst mode to optimize PCI bus utilization and allow the Upload Engine to access them effectively.

Mini-normal RBD ring/cache can be used to upload a received packet with its length determined to be less than the average normal packet size.

Normal RBD ring/cache can be used to upload a received packet with its length determined to be less than the maximum normal packet size (1.5 Kbytes for ethernet packets) but greater than the average normal packet size.

Mini-jumbo RBD ring/cache can be used to upload a received packet with its length determined to be less than the average jumbo packet size but greater than the maximum normal packet size.

Jumbo RBD ring/cache can be used to upload a received packet with its length determined to be less than the maximum jumbo size (for example: 9 Kbytes) but greater than the average jumbo packet size.

The receive buffer size defined in mini-normal RBD ring/cache can be dynamically adjusted for example, through "average normal packet byte count=total normal packet bytes count/total normal packet count".

Host software can read the average normal packet byte count when the total normal packet byte count register is about to overflow (interrupt will be generated to host). It will use this count value as the new Rx buffer length to be used in mini-normal RBD ring. Other intermediate packet sizes may be used, such as a median packet size, or a size predicted for a particular application.

The receive buffer size defined in mini-jumbo RBD ring/cache can be dynamically adjusted for example, through "average jumbo packet byte count=total jumbo packet byte count/total jumbo packet count."

Host software can read the average jumbo packet byte count when the total jumbo packet byte count register is about to overflow (interrupt will be generated to host). It will use this count value as the new Rx buffer length to be used in mini-jumbo RBD ring. Other intermediate packet sizes may be used, such as a median packet size, or a size predicted for a particular application.

Figure 3:
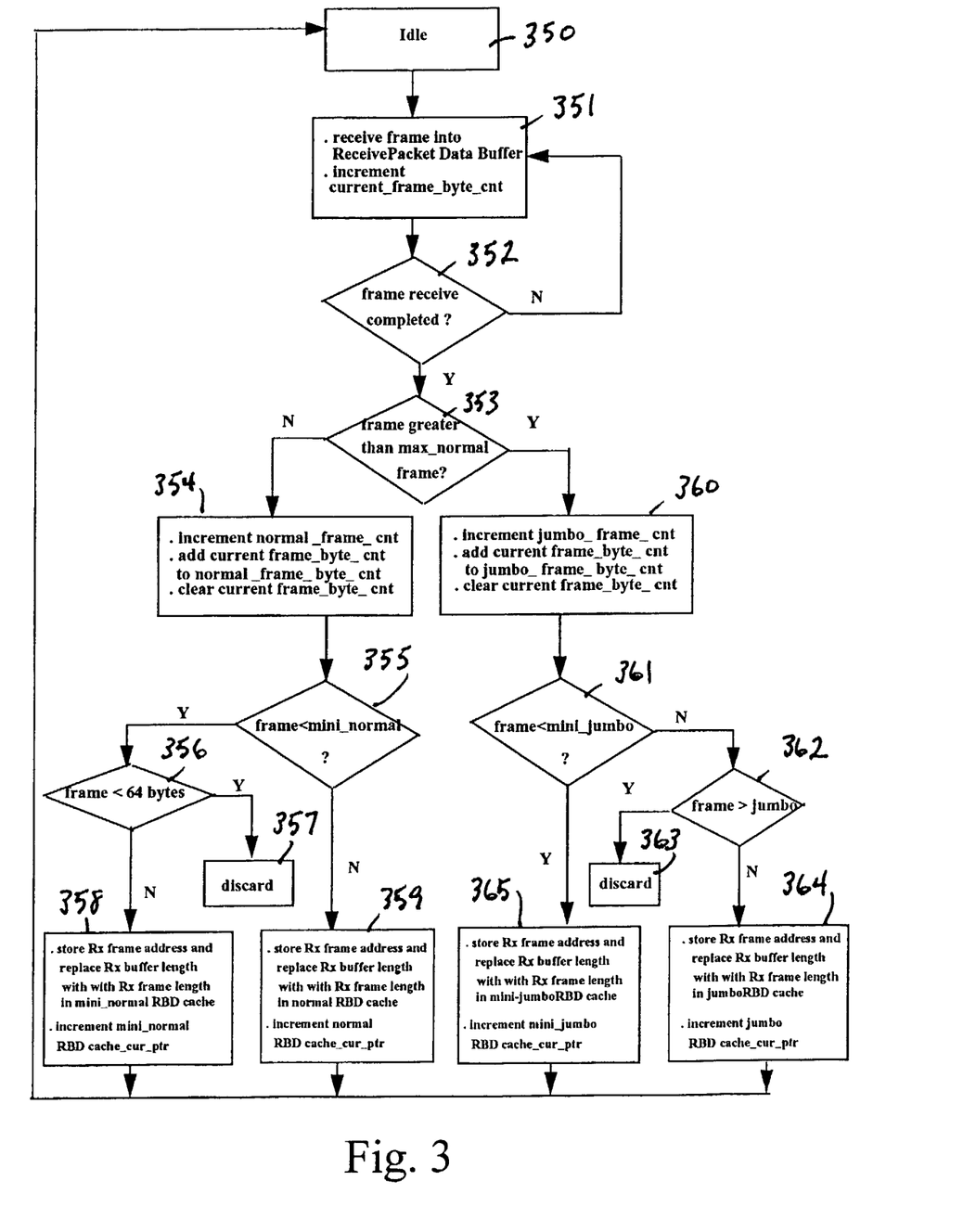
FIG. 3 is a flow diagram for the receive buffer distribution logic in the system of FIG. 2.

A flow diagram illustrating operation of the receive buffer distribution logic 317 of FIG. 2 is provided in FIG. 3. The receive buffer distribution logic 317 is used to classify the size of received packets and store the addresses and lengths of the packets into the respective RBD cache entry. The process begins in an idle state (block 350). As a packet is being received, the process transitions to block 351, and the packet data is placed into Receive Packet Data Buffer. Each time a byte is received, a packet byte count register current_packet_byte_cnt will be incremented by one. The process checks for the end of a packet (block 352), and continues looping through block 351 until all the packet data is received.

Next, the packet byte count register will be checked (block 353). If the packet size is less than the maximum size of the standard packet (1.5 Kbytes for a ethernet packet), the control will go to the standard packet handler (block 354). In block 354, a count of standard packets normal_packet_cnt will be incremented by one and the current_packet_byte_cnt will be accumulated into the normal_packet_byte_cnt register. The current_packet_byte_cnt will be cleared for the next received packet.

Next, the logic determines whether the current received packet size is less than the mini_normal packet size (derived from the average_normal_byte_cnt) (block 355) and is greater than the minimum packet size (block 356). If the packet size less than 64 bytes, it will be discarded (block 357). If the current received packet size is greater than 64 bytes at block 356, then the received packet address (pointing to NIC's Receive Packet Data Buffer) and the received packet length will be stored into an assigned entry in the mini_normal RBD list in the RBD cache (block 358). In this embodiment, packets are assigned to entries in the list in response to a cache current pointer cache_cur_ptr. Thus, in block 358, the mini_normal RBD cache's cache_cur_ptr will be incremented by one for the next received mini-normal packet. If the current received packet size is greater than the mini_normal packet size at block 355, then the received packet address and length will be stored into an assigned entry in the normal RDB cache, and the normal RBD cache's cache_cur_ptr will be incremented by one for the next received packet (block 359).

If at block 353, the packet size is greater than the maximum standard packet size, then the algorithm branches to block 360. In block 360, a count of jumbo packets jumbo_packet_cnt will be incremented by one to indicate a jumbo packet has been received. The current_packet_byte_cnt will be accumulated to the jumbo_packet_byte_cnt register and the current_packet_byte_cnt will be cleared to get ready for the next received packet.

In block 361, it is determined whether the jumbo packet has a packet size less than the mini_jumbo packet size. If the current received packet size is less than the mini_jumbo packet size (derived from the average_jumbo_byte_cnt), the received packet address (in NIC's Receive Packet Data Buffer) and the received packet length will be stored into an assigned entry in the mini_jumbo RBD cache, and the mini_jumbo RBD cache's cache_cur ptr will be incremented by one for the next received mini-jumbo packet (block 365).

If at block 361, it is determined that the current received packet size is greater than the mini_jumbo packet size, the algorithm branches to block 362 to determined whether the packet size is less than the maximum jumbo packet size. If the packet size is less than, or equal to, the maximum jumbo packet size, then the received packet address and length will be stored into jumbo RDB cache and the jumbo RBD cache's cache_cur_ptr will be incremented by one for the next received jumbo packet (block 364). If at block 362, it is determined that the packet size is greater than the maximum jumbo packet size, the packet will be discarded (block 363).

Figure 4:
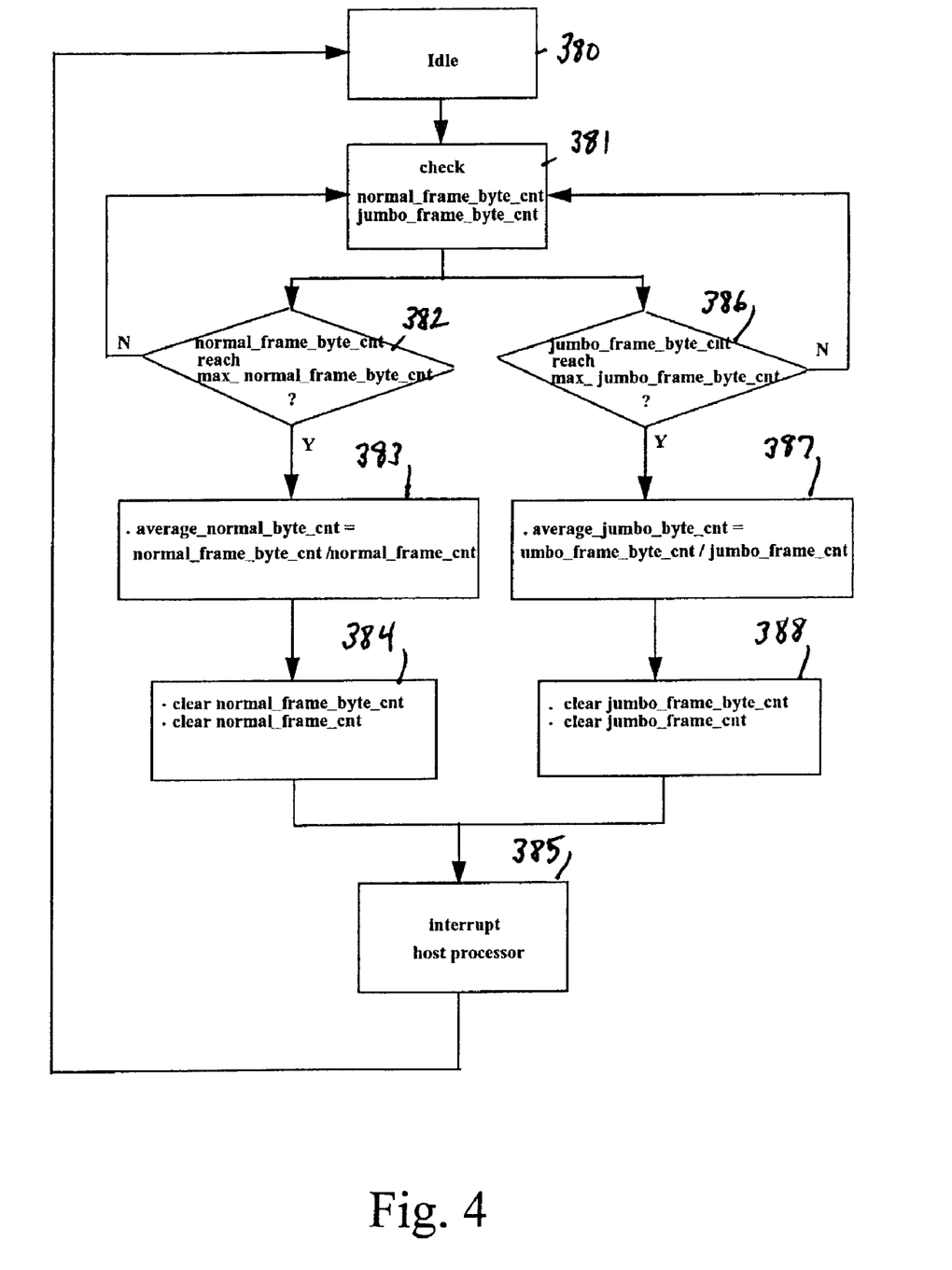
FIG. 4 is a flow diagram for the dynamic byte count calculation unit in the system of FIG. 2.

FIG. 4 illustrates a flow diagram for a representative dynamic average byte count calculation block 314 of FIG. 2. The dynamic average byte count calculation block 314 is used to compute the average byte count for normal and jumbo packets. This information can then be used by the host driver to optimize buffer sizes for the mini-normal and mini-jumbo RBD lists.

The process begins in an idle state (block 380). It periodically checks the byte count registers for the normal and jumbo packets (block 381). If the normal_packet_byte_cnt reaches a specified maximum value (block 382), the average normal packet byte count will be computed through the total byte count for all the normal received packets divided by the total number of received standard packets (average_normal_byte_cnt=normal_packet_byte_cnt/normal_packet_cnt) (block 383). Then, the counters for normal frame byte count and normal frame count are cleared (block 384). In an alternative, the average is computed when the count of standard packets normal_frame_cnt, reaches a prespecified maximum number.

Likewise, if the jumbo packet_byte_cnt reaches its maximum value (block 386), the average jumbo packet byte count will be computed through the total byte count for all the received jumbo packets divided by the total received jumbo packets (average_jumbo_byte_cnt=jumbo_ packet_ byte_cnt/jumbo_packet_cnt) (block 387). Alternatively, the average can be computed when a maximum number of jumbo packets as indicated by jumbo_packet_cnt, is reached. Next, the counters for the jumbo frame byte count and jumbo frame count are cleared (block 388). Finally, the host processor will be notified by an interrupt or otherwise (block 385), and can then use the newly updated average normal packet byte count value to set up the receive buffer sizes in mini_normal RBD rings or use the newly updated average jumbo packet byte count value to set up the receive buffer sizes in mini_jumbo RBD rings for future packet upload needs. When the host driver reallocates the receive buffers, the new average byte counts of the normal packets and jumbo packets being received can be used to determine which of the RBD cache lists the received packet should be placed into to optimize the receive buffer usage.

Figure 5:
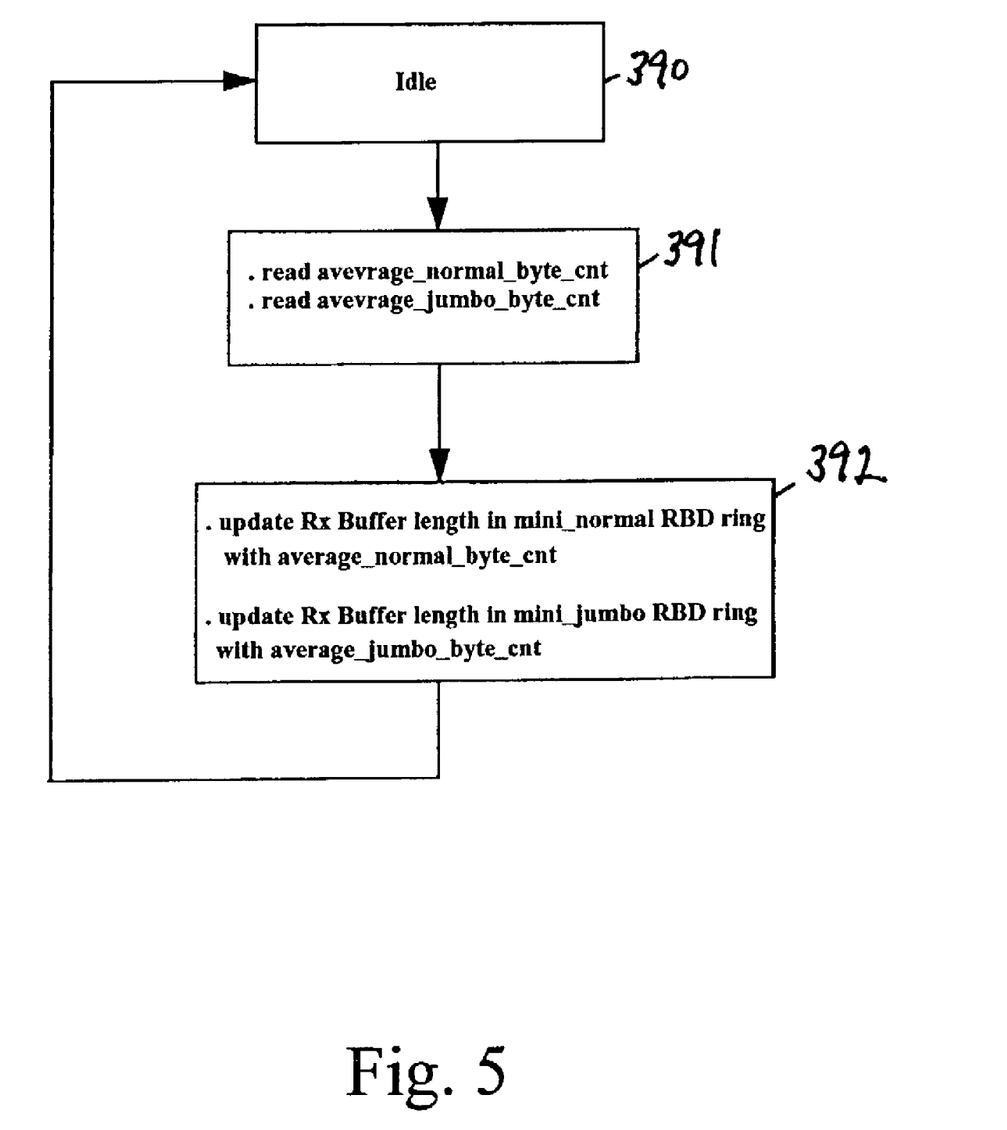
FIG. 5 is a simplified flow diagram for receive buffer descriptor processing by a host driver for the system of FIG. 2.

Host RBD processing by the host driver is illustrated in FIG. 5. Upon receiving an interrupt, host processor will transition from the idle state 390, and start reading the newly computed average normal packet byte count and average jumbo packet byte count (block 391). These values represent the average standard packet size and the average jumbo packet size actually being received on the interface. If there is any change from last time, the new value will be used to update the receive buffer length in mini_normal RBD ring or mini_jumbo RBD ring for future packet upload needs (block 392). The interface is informed when the reallocation has been accomplished, so that the new average values may be used there for assignment of the RBD cache entries.

Figure 6:
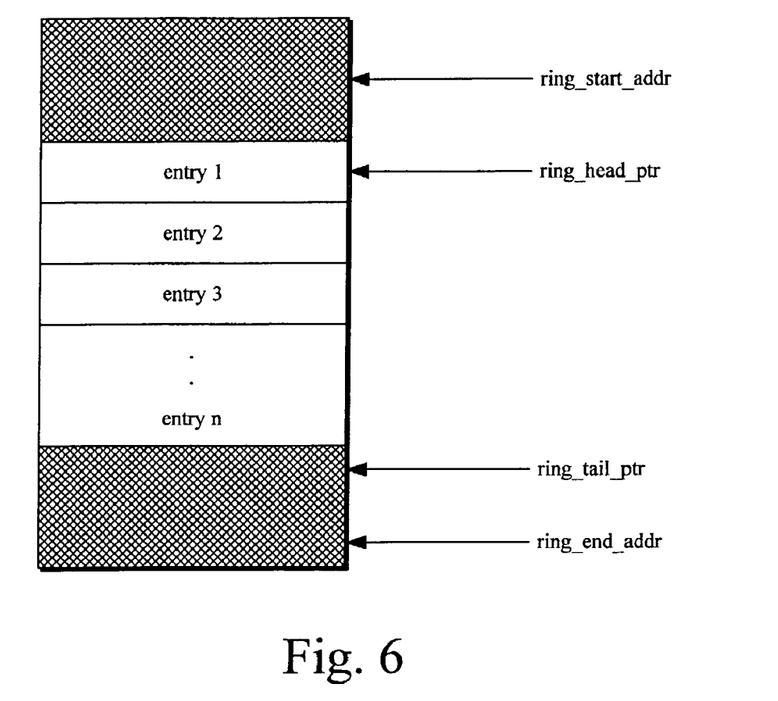
FIG. 6 illustrates a structure for a receive buffer descriptor ring in host memory according to one embodiment of the invention.

The receive buffer descriptor structure is described with reference to FIGS. 6 through 9 for one preferred example of the present invention. FIG. 6 represents the receive buffer descriptor ring in host memory.

There are four different RBD rings which can be used to store the RBDs for mini_normal, normal, mini_jumbo and jumbo packets. Each ring includes a plurality of entries, entry 1, entry 2, entry 3, ... entry n. The ring memory space is defined by a starting address ring_start_addr, and ending address ring_end_addr. The plurality of entries are located within the memory space by a ring_head_ptr pointing to the first entry in the list, and a ring_tail_ptr which points to a data location following the last entry in the list. The RBD rings are used to store the RBDs which can be used to upload the received packets from receive packet data buffer into host memory. These RBDs are set up by a driver, usually under control of the host system, and are prefetched into NIC's local RBD cache using a cache management routine. Each ring shares the same data structure with ring_start_addr and ring_end_addr to define the address space for each ring in host memory. The ring_head_ptr points to the top entry within each ring that is available for prefetch into local RBD cache, for use by an upload operation after assignment to a packet in the NIC. The ring_tail_ptr points to the first available entry for a next RBD entry to be appended to the list by the driver.

Figure 7:
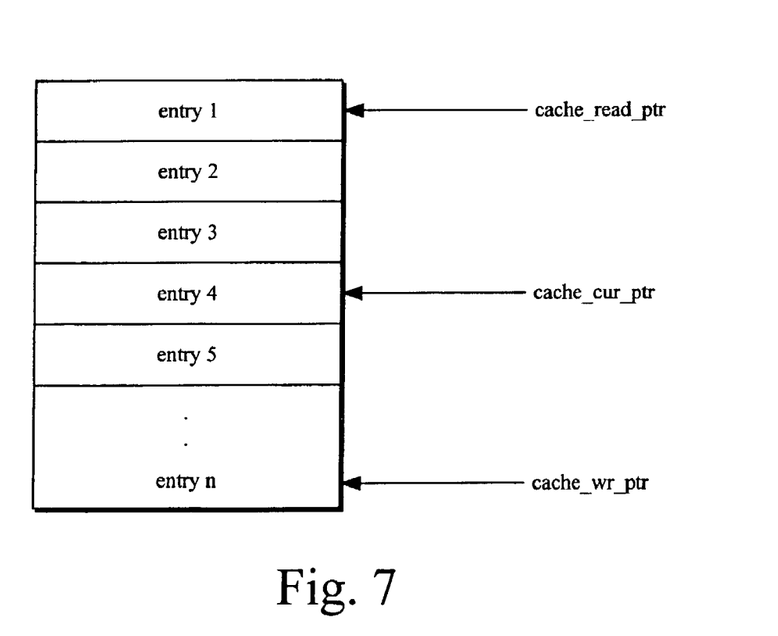
FIG. 7 illustrates a structure for a receive buffer descriptor cache according to one embodiment of the present invention.

FIG. 7 illustrates the RBD cache data structure. The RBD cache stores a subset of the RBD entries from the host rings, in memory on the NIC to allow fast descriptor access by an upload engine to transfer the received packets into host memory. The RBDs in host memory can be prefetched into NIC's RBD cache in burst mode. Each RBD cache list has a set of pointers, including a read pointer cache_read_ptr, a write pointer cache_cur_ptr, and pointer to a current entry cache_cur_ptr. The cache_read_ptr can be used by the Upload Engine to fetch the top entry from RBD cache list. The cache_wr_ptr can be used to by the RBD Fetch Engine to transfer the RBDs from the corresponding RBD ring in host memory into RBD cache list. The cache_cur_ptr can be used by Receive Buffer Distribution Logic assign an entry by adding the received packet address and length in the buffer memory to the entry, which can then be used by the Upload Engine to upload the received packet from receive packet data buffer into host memory.

Figure 8:
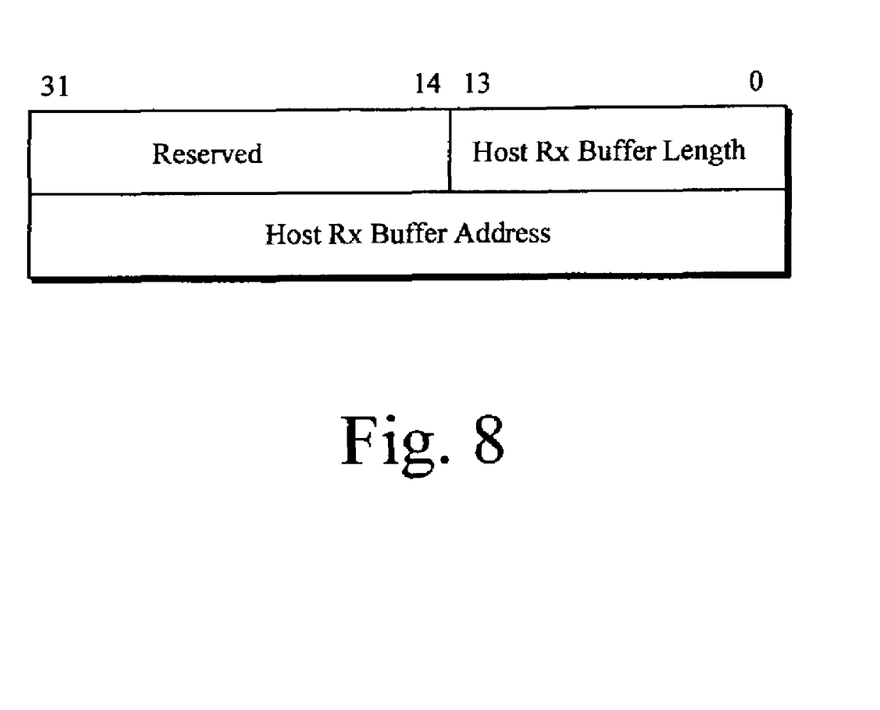
FIG. 8 illustrates a format for a receive buffer descriptor before assignment of a particular packet according to one embodiment of the invention.
Figure 9:
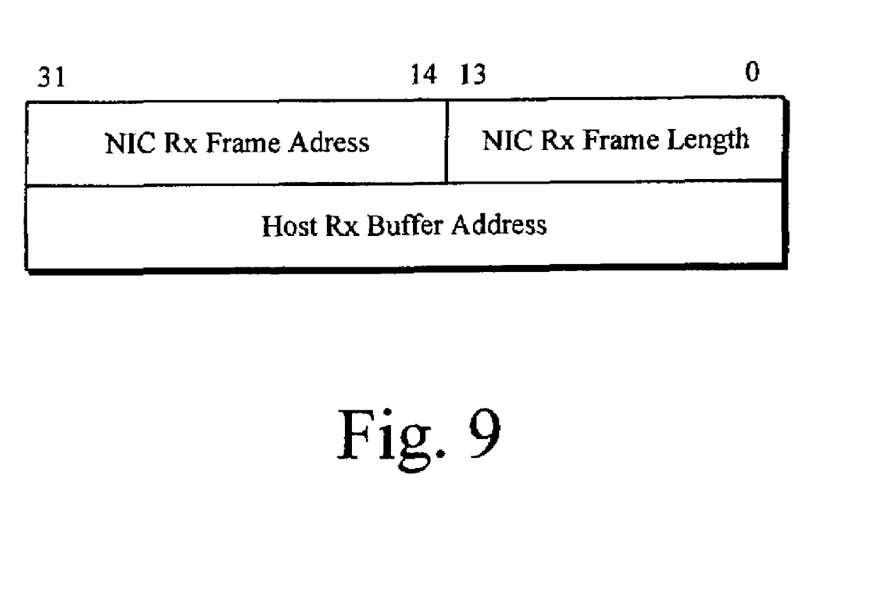
FIG. 9 illustrates a format for a receive buffer descriptor after assignment to a particular packet according to one embodiment of the invention.

FIGS. 8 and 9 illustrate the structure of the descriptors for one embodiment of the invention. FIG. 8 illustrates the structure before a packet is allocated to the descriptor. Each Receive Buffer Descriptor (RBD) prefetched from host memory to a RBD cache list on the NIC has the format of FIG. 8, which consists of Host Rx Buffer Address and Host Rx Buffer Length. Host Rx Buffer address and length are provided and set up in host memory through the driver, and locate the receive buffer in host memory for the packet to be uploaded. The Host Rx Buffer Length field occupies the bits 13:0 of a first word in the descriptor. The Host Rx Buffer Address occupies bits 31:0 of a second word. Bits 31:14 of the first word are reserved.

When a packet is received, the receive buffer distribution logic is invoked to assign the packet to an entry in the RBD cache, which results in changing the descriptor format to that shown in FIG. 9. In the format of FIG. 9, the NIC received packet address will be stored in bits 31:14 of the first word, and the NIC received packet length will replace Host Rx Buffer Length in bits 13:0 of the first word. While Host Rx Buffer address can be used to locate the Rx Buffer in host memory for the packet to be uploaded, the NIC received packet address and length can be used to access the received packet in receive packet data buffer to be uploaded through PCI bus to host memory.

In summary, a data processing system adapted for high-speed network communications, a method for managing a network interface and a network interface for such system are provided, in which processing of packets received over the network is supported by embedded logic at the network interface level. The host system allocates receive buffers in a plurality of sets according to buffer size. The receive buffer descriptors for the plurality of sets of received buffers are supplied to the network interface. Incoming packets on the network interface are stored in a buffer memory in the interface, and assigned to the receive buffer descriptors stored on the interface according to their size. Statistics about the size of incoming packets are accumulated in the network interface, and reported to the host system to optimize the size of receive buffers. A data processing system, a method for management of a network interface and a network interface are also provided by the present invention that include support for dynamic optimization of receive buffers.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An interface in which packets are transferred between a network medium and a host system, comprising:
   a first port adapted to be coupled to the network medium;
   a second port adapted to be coupled to the host system;
   buffer memory, coupled to the first and second ports, storing packets in transit between the first and second ports;
   a receive buffer descriptor cache storing a plurality of sets of receive buffer descriptors, each set corresponding with a corresponding set of receive buffers, the sets of receive buffers including buffers allocated for storage of received packets, the receive buffer descriptors in a first one of said sets of receive buffer descriptors corresponding buffers having a buffer size specified according to a maximum packet size parameter, and the receive buffer descriptors in a second one of said sets of receive buffer descriptors corresponding buffers having a buffer size specified according to an intermediate packet size parameter smaller than said maximum;
   logic, coupled with the buffer memory, to assign packets stored in the buffer memory to a receive buffer descriptor in one of said sets of receive buffer descriptors according to packet size; and
   upload logic coupled to the buffer memory to manage uploading packets using the assigned receive buffer descriptors.

2. The interface of claim 1, including:
   logic to determine the packet sizes of packets stored in the buffer memory.

3. The interface of claim 1, including logic to determine an average packet size over a set of packets received in the interface, and to report the average packet size to the host system.

4. The interface of claim 1, wherein said interface operates according to a network protocol having a maximum standard packet size and a maximum jumbo packet size larger than the maximum standard packet size, and the receive buffer descriptors in a third one of said sets of receive buffer descriptors corresponding buffers having a buffer size specified according to a maximum jumbo packet size parameter, and the receive buffer descriptors in a fourth one of said sets of receive buffer descriptors corresponding buffers having a buffer size specified according to a jumbo intermediate packet size parameter smaller than said maximum jumbo packet size parameter.

5. The interface of claim 1, wherein said interface operates according to a network protocol having a standard maximum packet size, and including:
   logic to determine a first average size of incoming packets having a packet size less than or equal to said maximum standard packet size, and to determine a second average size of incoming packets having a packet size greater than said maximum standard packet size; and
   logic to report the first and second average packet sizes to the host system.

6. The interface of claim 1, wherein said interface operates according to a network protocol having a maximum standard packet size corresponding to said maximum packet size, and a maximum jumbo packet size larger than the maximum standard packet size, and the receive buffer descriptors in a third one of said sets of receive buffer descriptors corresponding buffers having a buffer size specified according to a maximum jumbo packet size parameter, and the receive buffer descriptors in a fourth one of said sets of receive buffer descriptors corresponding buffers having a buffer size specified according to an average jumbo packet size parameter; and including:
   logic to determine a first average size of incoming packets having a packet size less than or equal to said maximum standard packet size and greater than a minimum valid packet size, and to determine a second average size of incoming packets having a packet size greater than said maximum standard packet size and less than or equal to said maximum jumbo packet size; and
   logic to report the first and second average packet sizes to the host system.

7. The interface of claim 1, including logic to determine an average packet size over a set of packets received in the interface, and to report the average packet size to the host system, and wherein said intermediate packet size parameter is based on said average packet size.

8. A method for managing an interface in which packets are transferred through a buffer memory between a network medium and a host system, comprising:
   providing a receive buffer descriptor cache in the interface storing a plurality of sets of receive buffer descriptors, each set corresponding with a corresponding set of receive buffers accessible via the host system, the sets of receive buffers including buffers allocated for storage of received packets, the receive buffer descriptors in a first one of said sets of receive buffer descriptors corresponding to receive buffers having a buffer size specified according to a maximum packet size parameter, and the receive buffer descriptors in a second one of said sets of receive buffer descriptors corresponding receive buffers having a buffer size specified according to an intermediate packet size parameter smaller than said maximum;
   assigning packets stored in the buffer memory to a receive buffer descriptor in one of said sets of receive buffer descriptors according to packet size; and
   uploading said packets using the assigned receive buffer descriptors.

9. The method of claim 8, including determining an average packet size over a set of packets received in the interface, and reporting the average packet size to the host system.

10. The method of claim 8, including classifying incoming packets into a plurality of classes according to size, and counting the number of packets in each class.

11. The method of claim 8, wherein said interface operates according to a network protocol having a maximum standard packet size and a maximum jumbo packet size larger than the maximum standard packet size; the receive buffer descriptors in a third one of said sets of receive buffer descriptors corresponding buffers having a buffer size specified according to a maximum jumbo packet size parameter, and the receive buffer descriptors in a fourth one of said sets of receive buffer descriptors corresponding buffers having a buffer size specified according to a jumbo intermediate packet size parameter smaller than said maximum jumbo packet size parameter.

12. The method of claim 8, wherein said interface operates according to a network protocol having a maximum standard packet size, and including:
determining a first average size of incoming packets having a packet size less than or equal to said maximum standard packet size, and to determine a second average size of incoming packets having a packet size greater than said maximum standard packet size; and
reporting the first and second average packet sizes to the host system.

13. The method of claim 8, wherein said interface operates according to a network protocol having a maximum standard packet size corresponding to said maximum packet size, and a maximum jumbo packet size larger than the maximum standard packet size, and the receive buffer descriptors in a third one of said sets of receive buffer descriptors corresponding to receive buffers having a buffer size specified according to a maximum jumbo packet size parameter, and the receive buffer descriptors in a fourth one of said sets of receive buffer descriptors corresponding to receive buffers having a buffer size specified according to an average jumbo packet size parameter; and including:
determining a first average size of incoming packets having a packet size less than or equal to said maximum standard packet size, and to determine a second average size of incoming packets having a packet size greater than said maximum standard packet size and less than or equal to said maximum jumbo packet size; and
reporting the first and second average packet sizes to the host system.

14. The method of claim 8, including determining an average packet size over a set of packets received in the interface, and to report the average packet size to the host system, and wherein said intermediate packet size parameter is based on said average packet size.

15. An integrated circuit for an interface in which packets are transferred between a network medium and a host system, the integrated circuit comprising:
medium access control (MAC) unit through which data transferred at a data transfer rate of 100 Megabits per second or higher;
a port through which data is transferred;
buffer memory, coupled to the MAC unit and the port, storing packets in transit between the network medium and the port;
a receive buffer descriptor cache storing a plurality of sets of receive buffer descriptors, each set corresponding with a corresponding set of receive buffers, the sets of receive buffers including buffers allocated for storage of received packets, the receive buffer descriptors in a first one of said sets of receive buffer descriptors corresponding buffers having a buffer size specified according to a maximum packet size parameter, and the receive buffer descriptors in a second one of said sets of receive buffer descriptors corresponding buffers having a buffer size specified according to an intermediate packet size parameter smaller than said maximum;
logic, coupled with the buffer memory, to assign packets stored in the buffer memory to a receive buffer descriptor in one of said sets of receive buffer descriptors according to packet size; and
upload logic coupled to the buffer memory to manage uploading packets using the assigned receive buffer descriptors.

16. The integrated circuit of claim 15, including:
logic to determine the packet sizes of packets stored in the buffer memory.

17. The integrated circuit of claim 15, including logic to determine an average packet size over a set of packets received in the interface, and to report the average packet size to the host system.

18. The integrated circuit of claim 15, wherein said interface operates according to a network protocol having a maximum standard packet size and a maximum jumbo packet size larger than the maximum standard packet size, and the receive buffer descriptors in a third one of said sets of receive buffer descriptors corresponding to receive buffers having a buffer size specified according to a maximum jumbo packet size parameter, and the receive buffer descriptors in a fourth one of said sets of receive buffer descriptors corresponding to receive buffers having a buffer size specified according to a jumbo intermediate packet size parameter smaller than said maximum jumbo packet size parameter.

19. The integrated circuit of claim 15, wherein said interface operates according to a network protocol having a standard maximum packet size, and including:
logic to determine a first average size of incoming packets having a packet size less than or equal to said maximum standard packet size, and to determine a second average size of incoming packets having a packet size greater than said maximum standard packet size; and
logic to report the first and second average packet sizes to the host system.

20. The integrated circuit of claim 15, wherein said interface operates according to a network protocol having a maximum standard packet size corresponding to said maximum packet size, and a maximum jumbo packet size larger than the maximum standard packet size, and the receive buffer descriptors in a third one of said sets of receive buffer descriptors corresponding to receive buffers having a buffer size specified according to a maximum jumbo packet size parameter, and the receive buffer descriptors in a fourth one of said sets of receive buffer descriptors corresponding to receive buffers having a buffer size specified according to an average jumbo packet size parameter; and including:
logic to determine a first average size of incoming packets having a packet size less than or equal to said maximum standard packet size, and to determine a second average size of incoming packets having a packet size greater than said maximum standard packet size and less than or equal to said maximum jumbo packet size; and
logic to report the first and second average packet sizes to the host system.

21. The integrated circuit of claim 15, including logic to determine an average packet size over a set of packets received in the interface, and to report the average packet size to the host system, and wherein said intermediate packet size parameter is based on said average packet size.

22. A method for managing an interface in which packets are transferred through a buffer memory between a network medium and a host system, comprising:
- establishing a plurality of sets of receive buffers in the host system, each set of receive buffers including receive buffers having a buffer size specified for the set;
- providing a cache memory having receive buffer descriptors corresponding to receive buffers in said plurality of sets in the host system;
- storing packets received at the interface from the network medium in a buffer memory;
- determining a size for the received packets, and assigning the received packets to one of the receive buffer descriptors in the cache memory according to the determined size;
- classifying incoming packets into a plurality of classes according to size, and counting the number of packets in each class; and
- using the assigned receive buffer descriptor to make packets available from the buffer memory.

23. The method of claim 22, including maintaining lists of receive buffer descriptors in the host system for said plurality of sets of receive buffers.

24. The method of claim 22, wherein said receive buffer descriptors comprise an address field for holding an address for a corresponding receive buffer in the host system, a data length field for holding a value indicating a length of a packet assigned to the entry, and a pointer field for holding a pointer to the assigned packet in the buffer memory.

25. The method of claim 22, including:
maintaining lists of receive buffer descriptors in the host system for said plurality of sets of receive buffers; and
storing a plurality of lists of receive buffer descriptors in said cache memory, the plurality of lists of receive buffer descriptors corresponding to said lists in the host system.

26. The method of claim 22, including:
maintaining statistics concerning packet size, and dynamically updating buffer sizes for at least one set of receive buffers in the plurality of sets.

27. The method of claim 22, including:
said cache memory comprises a receive buffer descriptor cache in the interface storing a plurality of sets of receive buffer descriptors, each set corresponding with a corresponding to a set of receive of receive buffers in the host system, the receive buffer descriptors in a first one of said sets of receive buffer descriptors corresponding to a set of receive buffers having a buffer size specified according to a maximum packet size parameter, and the receive buffer descriptors in a second one of said sets of receive buffer descriptors corresponding to a set of receive buffers having a buffer size specified according to an intermediate packet size parameter smaller than said maximum.

28. The method of claim 22, including determining an average packet size over a set of packets received in the interface, and reporting the average packet size to the host system.

29. The method of claim 22, wherein said interface operates according to a network protocol having a maximum standard packet size and a maximum jumbo packet size larger than the maximum standard packet size; said cache memory comprises a receive buffer descriptor cache in the interface storing a plurality of sets of receive buffer descriptors, each set corresponding with a corresponding set of receive buffers accessible in the host system, the receive buffer descriptors in a first one of said sets of receive buffer descriptors corresponding to a set of receive buffers having a buffer size specified according to a maximum packet size parameter, and the receive buffer descriptors in a second one of said sets of receive buffer descriptors corresponding to a set of receive buffers having a buffer size specified according to an intermediate packet size parameter smaller than said maximum, the receive buffer descriptors in a third one of said sets of receive buffer descriptors corresponding to a set of receive buffers having a buffer size specified according to a maximum jumbo packet size parameter, and the receive buffer descriptors in a fourth one of said sets of receive buffer descriptors corresponding to a set of receive buffers having a buffer size specified according to a jumbo intermediate packet size parameter smaller than said maximum jumbo packet size parameter.

30. The method of claim 22, wherein said interface operates according to a network protocol having a standard maximum packet size, and including:
- determining a first average size of incoming packets having a packet size less than or equal to said maximum standard packet size, and to determine a second average size of incoming packets having a packet size greater than said maximum standard packet size; and
- reporting the first and second average packet sizes to the host system.

31. The method of claim 22, wherein said interface operates according to a network protocol having a maximum standard packet size corresponding to said maximum packet size, and a maximum jumbo packet size larger than the maximum standard packet size, and said cache memory comprises a receive buffer descriptor cache in the interface storing a plurality of sets of receive buffer descriptors, each set corresponding with a corresponding set of receive buffers accessible in the host system, the receive buffer descriptors in a first one of said sets of receive buffer descriptors corresponding to a set of receive buffers having a buffer size specified according to a maximum packet size parameter, and the receive buffer descriptors in a second one of said sets of receive buffer descriptors corresponding to a set of receive buffers having a buffer size specified according to an intermediate packet size parameter smaller than said maximum, the receive buffer descriptors in a third one of said sets of receive buffer descriptors corresponding to a set of receive buffers having a buffer size specified according to a maximum jumbo packet size parameter, and the receive buffer descriptors in fourth one of said sets of receive buffer descriptors corresponding to a set of receive buffers having a buffer size specified according to an average jumbo packet size parameter; and including:
- determining a first average size of incoming packets having a packet size less than or equal to said maximum standard packet size and greater than a minimum valid packet size, and to determine a second average size of incoming packets having a packet size greater than said maximum standard packet size and less than or equal to said maximum jumbo packet size;
- reporting the first and second average packet sizes to the host system; and
- updating the buffer sizes in sets of receive buffers corresponding to said second and fourth sets of receive buffer descriptors in response to said first and second averages.

32. The method of claim 22, including determining an average packet size over a set of packets received in the interface, and reporting the average packet size to the host system, and wherein said buffer size for one of said sets of receive buffers is based on said average packet size.

33. A data processing system, comprising:
a processor;
host memory;
a plurality of sets of receive buffers in the host memory, each set of receive buffers including receive buffers having a buffer size specified for the set;
a host bus system coupled to the processor and the host memory;
a network interface coupled to the host bus system, in which packets are transferred between a network medium and a host bus system, the network interface including:
a first port adapted to be coupled to the network medium;
a second port adapted to be coupled to the host bus system;
buffer memory, having an incoming data path coupled to the first port, storing packets in transit between the first and second ports;
cache memory in the interface, the cache memory having receive buffer descriptors corresponding to said sets of receive buffers in the host system, said cache memory comprising a receive buffer descriptor cache in the interface storing a plurality of sets of receive buffer descriptors, each set corresponding to a set of receive buffers, the receive buffer descriptors in a first one of said sets of receive buffer descriptors corresponding to a set of receive buffers having a buffer size specified according to a maximum packet size parameter, and the receive buffer descriptors in a second one of said sets of receive buffer descriptors corresponding to a set of receive buffers having a buffer size specified according to an intermediate packet size parameter smaller than said maximum;
logic to determine a size for received packets, and to assign the received packets to one of the receive buffer descriptors in the cache memory according to the determined size; and
logic to upload packets to the host system from the buffer memory using the receive buffer descriptor corresponding to the assigned entry in the cache memory.

34. The data processing system of claim 33, including a driver maintaining lists of receive buffer descriptors in the host system for said plurality of sets of receive buffers.

35. The data processing system of claim 33, wherein said receive buffer descriptors comprise an address field for holding an address for a corresponding receive buffer in the host system, a data length field for holding a value indicating a length of a packet assigned to the entry, and a pointer field for holding a pointer to the assigned packet in the buffer memory.

36. The data processing system of claim 33, including:
a driver maintaining lists of receive buffer descriptors in the host system for said plurality of sets of receive buffers; and
cache management logic storing a plurality of lists of receive buffer descriptors in said cache memory, the plurality of lists of receive buffer descriptors corresponding to said lists in the host system.

37. The data processing system of claim 33, including:
logic maintaining statistics concerning packet size, and dynamically updating buffer sizes for at least one set of receive buffers in the plurality of sets.

38. The data processing system of claim 33, including logic determining an average packet size over a set of packets received in the interface, and reporting the average packet size to the host system.

39. The data processing system of claim 33, including logic classifying incoming packets into a plurality of classes according to size, and counting the number of packets in each class.

40. The data processing system of claim 33, wherein said interface operates according to a network protocol having a maximum standard packet size and a maximum jumbo packet size larger than the maximum standard packet size; said cache memory comprises a receive buffer descriptor cache in the interface storing a plurality of sets of receive buffer descriptors, each set corresponding with a corresponding set of receive buffers accessible in the host system, the receive buffer descriptors in a first one of said sets of receive buffer descriptors corresponding to a set of receive buffers having a buffer size specified according to a maximum packet size parameter, and the receive buffer descriptors in a second one of said sets of receive buffer descriptors corresponding to a set of receive buffers having a buffer size specified according to an intermediate packet size parameter smaller than said maximum, the receive buffer descriptors in a third one of said sets of receive buffer descriptors corresponding to a set of receive buffers having a buffer size specified according to a maximum jumbo packet size parameter, and the receive buffer descriptors in a fourth one of said sets of receive buffer descriptors corresponding to a set of receive buffers having a buffer size specified according to a jumbo intermediate packet size parameter smaller than said maximum jumbo packet size parameter.

41. The data processing system of claim 33, wherein said interface operates according to a network protocol having a standard maximum packet size, and including:
logic determining a first average size of incoming packets having a packet size less than or equal to said maximum standard packet size, and to determine a second average size of incoming packets having a packet size greater than said maximum standard packet size; and
logic reporting the first and second average packet sizes to the host system.

42. The data processing system of claim 33, wherein said interface operates according to a network protocol having a maximum standard packet size corresponding to said maximum packet size, and a maximum jumbo packet size larger than the maximum standard packet size, and said cache memory comprises a receive buffer descriptor cache in the interface storing a plurality of sets of receive buffer descriptors, each set corresponding with a corresponding set of receive buffers accessible in the host system, the receive buffer descriptors in a first one of said sets of receive buffer descriptors corresponding to a set of receive buffers having a buffer size specified according to a maximum packet size parameter, and the receive buffer descriptors in a second one of said sets of receive buffer descriptors corresponding to a set of receive buffers having a buffer size specified according to an intermediate packet size parameter smaller than said maximum, the receive buffer descriptors in a third one of said sets of receive buffer descriptors corresponding to a set of receive buffers having a buffer size specified according to a maximum jumbo packet size parameter, and the receive buffer descriptors in fourth one of said sets of receive buffer descriptors corresponding to a set of receive buffers having a buffer size specified according to an average jumbo packet size parameter; and including:

logic determining a first average size of incoming packets having a packet size less than or equal to said maximum standard packet size and greater than a minimum valid packet size, and to determine a second average size of incoming packets having a packet size greater than said maximum standard packet size and less than or equal to said maximum jumbo packet size; and logic reporting the first and second average packet sizes to the host system; and a driver in the host system updating the buffer sizes in sets of receive buffers corresponding to said second and fourth sets of receive buffer descriptors in response to said first and second averages.

43. The data processing system of claim 33, including logic in the interface determining an average packet size over a set of packets received in the interface, and reporting the average packet size to the host system, and wherein said buffer size for one of said sets of receive buffers is based on said average packet size.

44. A computer program stored in machine readable form, executable by a processor for allocating receive buffers for a network interface, comprising:

logic to allocate receive buffers for packets incoming from the network interface, the receive buffers having locations and sizes specified by a plurality of sets of receive buffer descriptors, each set corresponding to a set of receive buffers, the receive buffer descriptors in a first one of said sets of receive buffer descriptors corresponding to a set of receive buffers having a buffer size specified according to a maximum packet size parameter, and the receive buffer descriptors in a second one of said sets of receive buffer descriptors corresponding to a set of receive buffers having a buffer size specified according to an intermediate packet size parameter smaller than said maximum; and logic to dynamically update the sizes of the allocated receive buffers based on statistics related to packets being received through the network interface.

45. A data processing system, comprising:

a processor;

host memory;

a host bus system coupled to the processor and the host memory;

a receive buffer descriptor cache storing a plurality of sets of receive buffer descriptors, each set corresponding with a corresponding set of receive buffers, the sets of receive buffers including buffers allocated for storage of received packets, the receive buffer descriptors in a first one of said sets of receive buffer descriptors corresponding buffers having a buffer size specified according to a maximum packet size parameter, and the receive buffer descriptors in a second one of said sets of receive buffer descriptors corresponding buffers having a buffer size specified according to an intermediate packet size parameter smaller than said maximum;

logic to allocate receive buffers in host memory for packets incoming from the network interface, the receive buffers having locations and sizes specified by receive buffer descriptors; and logic to dynamically update the sizes of the allocated receive buffers based on statistics related to packets being received through the network interface.

* * * * *